UNITED STATES PATENT OFFICE.

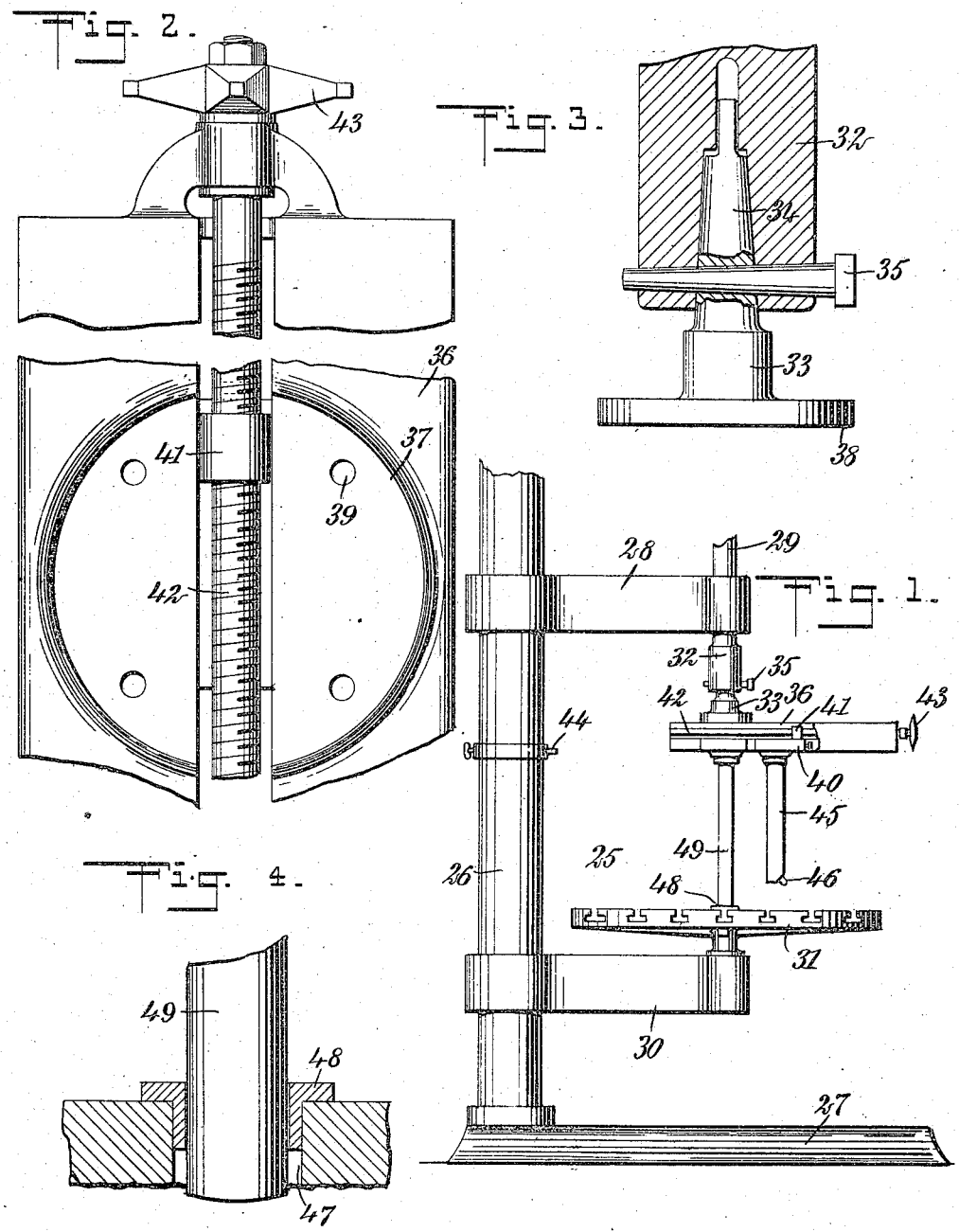

OTTO OSBORNE, OF ZANESVILLE, OHIO, ASSIGNOR OF ONE-HALF TO LANCE B. SLOCOMB, OF ZANESVILLE, OHIO.

BORING ATTACHMENT FOR DRILLS.

No. 881,822.   Specification of Letters Patent.   Patented March 10, 1908.

Application filed June 27, 1907. Serial No. 381,030.

*To all whom it may concern:*

Be it known that I, OTTO OSBORNE, a citizen of the United States, and a resident of Zanesville, in the county of Muskingum and State of Ohio, have invented a new and Improved Boring Attachment for Drills, of which the following is a full, clear, and exact description.

This invention relates to machine tools, and concerns itself especially with the construction of a boring attachment to be used with drill presses.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the lower portion of a drill press to which the invention has been applied, a portion of the arm being represented as broken away; Fig. 2 is a plan of a portion of the arm and illustrating its construction when the device is applied as a boring attachment for a drill; a portion of this view is broken away; Fig. 3 is a cross section through the socket at the end of the drill spindle and illustrating the manner of attaching the boring device thereto; and Fig. 4 is a vertical section through the work table of the drill press shown in Fig. 1 and illustrating the manner of insuring that the boring tool will be properly centered.

Referring especially to the parts, 25 represents the drill press having a post 26 mounted on a suitable base 27. At the upper portion of the post a spindle arm 28 projects horizontally, and in this arm the spindle 29 of the drill is adapted to rotate and slide in the usual manner.

Near the foot of the post 26 a table arm 30 projects horizontally and supports a drill table 31, the center of which is in alinement with the spindle 29. In applying my invention, I attach in the socket 32 at the lower end of the drill spindle, a hub 33. This hub is provided with a tapered shank 34 similar to that found in drills. This shank is received in the socket and held in position by means of a tapered pin 35 as shown. To the under side of this hub an arm 36 is rigidly attached. In attaching the hub to the arm, I provide the upper face of the arm with a countersink or recess 37 in which the flange 38 of the hub is received, and attached by means of screws received in the openings 39. The arm 36 is formed into a guideway having a sliding block, and this block carries a nut 41 mounted on a longitudinally disposed feed screw 42 which is carried in the arm and which projects from the outer end thereof as shown in Fig. 2. Upon the projecting end of the feed screw a feed wheel or star wheel 43 is attached. At each revolution of the arm this feed wheel is adapted to engage with a tripping stem 44 which is attached in any suitable manner to the post 26 as shown. The sliding block 40 carries a tool post 45 carrying a tool 46. I provide means for insuring that the arm 36 will rotate truly. For this purpose, in the central opening 47 which is always found in drill tables, I mount a bushing 48. In this bushing there is loosely received an arbor 49, the upper end of which is rigidly attached to the under side of the arm as indicated. In the operation of this tool, the work is fastened to the face of the drill table in the usual manner, the center of the work being centered with respect to the spindle 29. As the arm rotates with the spindle, at each revolution the star wheel 43 engages the trip stem 44 and gives the tool post 45 an outward feeding movement.

Attention is called to the fact that the spindle 29 can be raised or lowered in the usual manner, these movements being permitted by the sliding connection of the arbor 49 through the bushing 48. The arbor 49 greatly increases the rigidity and strength of the mounting for the arm, as will be readily understood.

Having thus described my invention, I claim as new and desire to secure by Letters Patent:

1. A drill press having a spindle with a socket in the lower end thereof and a table with an opening in alinement with said spindle, in combination with an arm having a hub secured in said socket, a tool guided in said arm, an arbor rigid with said arm and rotating in said opening, and means for automatically feeding said tool outwardly in said arm.

2. A boring attachment for a drill press, comprising an arm adapted to be attached to the drill spindle, a tool carried by said arm, feeding mechanism for said tool, and an arbor attached to said arm and adapted to center the same upon a support therebelow.

In testimony whereof I have signed my name to this specification in the presence of two subscribing witnesses.

OTTO OSBORNE.

Witnesses:
H. E. BUKER,
L. B. SLOCOMB.